United States Patent Office 3,532,718
Patented Oct. 6, 1970

3,532,718
CYANOMETHANODIOXOCINS AND
CARBOXYMETHANODIOXOCINS
Chun-Shan Wang, Midland, and Henry E. Hennis, Coleman, Mich., assignors to The Dow Chemical Company, Midland, Mich., a corporation of Delaware
No Drawing. Filed Mar. 25, 1968, Ser. No. 715,486
Int. Cl. C07d 7/24
U.S. Cl. 260—345.2         12 Claims

ABSTRACT OF THE DISCLOSURE

New cyanomethanodioxocins and carboxymethanodioxocins having the formula

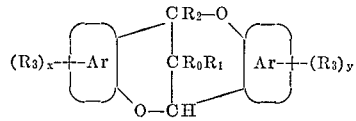

where each of $x$ and $y$ independently is an integer of from 0 to 4 inclusive; Ar is a homocyclic or heterocyclic substituted or unsubstituted ring; $R_0$ is H; $R_1$ is H, alkyl or aryl; $R_0$ and $R_1$ may together with the C to which they are attached form the cyclohexane ring, $R_2$ is H, alkyl or aryl; and $R_3$ is cyano or carboxyl, are made from their corresponding bromomethanodioxocins. The cyanodioxocins are useful starting materials for plasticizers and resins. The carboxymethanodioxocins have biological activity and are starting materials for plasticizers and resins.

CROSS-REFERENCE TO RELATED APPLICATIONS

These new cyanodioxocins and carboxymethanodioxocins are related to the bromomethanodioxocins as disclosed in the application filed by one of us, Hennis, entitled "Methanodioxocins and a Process for Making Them," Ser. No. 669,694, filed Sept. 22, 1967.

SUMMARY OF THE INVENTION

It has now been found that new cyanomethanodioxocins and carboxymethanodioxocins are made from their corresponding bromomethanodioxocins. These new methanodioxocins have the formula

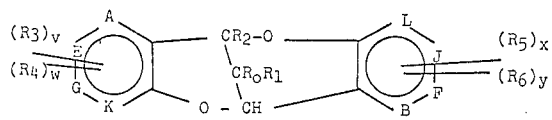

where each of $v$, $w$, $x$ and $y$ independently is an integer of from 0 to 4 inclusive; each of A, B, E, F, G, J, K and L independently is N or CH provided that neither A and E, E and G, G and K, B and F, F and J nor J and L can simultaneously be N; $R_0$ is H; $R_1$ is H, alkyl having up to eighteen carbon atoms or aryl having up to ten carbon atoms; $R_0$ and $R_1$ may together with the C to which they are attached form the cyclohexane ring; $R_2$ is H, alkyl having up to eighteen carbon atoms or aryl having up to ten carbon atoms; each of $R_3$, $R_4$, $R_5$ and $R_6$, being absent when their corresponding subscript $v$, $w$, $x$ or $y$ is 0, when present is independently alkyl having up to eighteen carbon atoms, aryl having up to ten carbon atoms, chlorine, cyano, carboxyl or OM where M is a hydrocarbon radical having up to eighteen carbon atoms provided that at least one of $R_3$, $R_4$, $R_5$ and $R_6$ is always cyano or carboxyl and further provided that in no case can a cyano and carboxyl group be present in the same molecule; and $R_3$ combined with $R_4$, as well as $R_5$ combined with $R_6$, together with the atoms to which they are attached, may form the pyridine, pyrimidine, quinoline, benzene, naphthalene, anthracene, phenanthrene or pyran ring. An example of a specific new cyanodioxocin is 2-cyano-6H,12H-6,12-methanodibenzo [b,f][1,5]dioxocin, or a shorter term, 2-cyano-MDBD

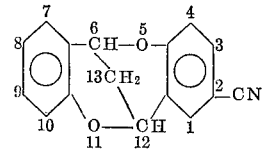

The numbering system used herein is indicated in the above formula.

An example of a specific new carboxymethanodioxocin is 2 - carboxy - 6H,12H-6,12-methanodibenzo[b,f][1,5] dioxocin, or a shorter term, 2-carboxy-MDBD

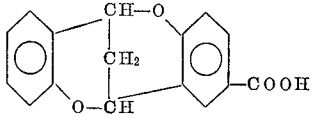

both of which are made from their corresponding bromodioxocin, 2-bromo-MDBD

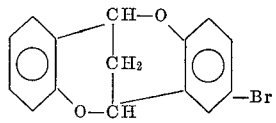

In a similar way, the abbreviation MBDBD is used for the compound 8H,14H-8,14-methanobenzo(a)dibenzo [b,f][1,5]dioxocin, having the formula

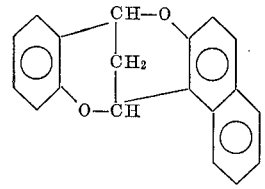

In order to produce the new cyanodioxocins, a bromodioxocin corresponding to the cyanodioxocin desired is contacted with cuprous cyanide in the presence of an inert solvent, e.g. pyridine, at a temperature between 100 and 200° C. wherein the molar ratio of cuprous cyanide to bromine on the dioxocin ring system is at least one to one. After reaction, the solvent is removed from the crude cyanodioxocin by conventional methods, e.g. distillation, and the crude cyanodioxocin is heated under weakly acidic conditions, e.g. 10 percent hydrochloric acid and dissolved in and recrystallized from a suitable solvent, e.g. acetone, to yield the pure product.

In order to produce the new carboxydioxocins, a bromodioxocin corresponding to the carboxydioxocin desired is contacted with lithium metal or an alkyllithium compound, e.g. n-butyl lithium in the presence of an inert solvent, e.g. a benzene and ether mixture. This mixture is heated under a nitrogen atmosphere and maintained at a temperature of between 30 and 100° C. The reaction mixture is then poured onto solid $CO_2$, and water is then added to form two layers. Acidification of the water layer with hydrochloric acid yields the desired carboxydioxocin which is purified by recrystallization from an appropriate solvent, e.g. tetrahydrofuran.

The bromodioxocin starting materials are prepared from the reaction of an appropriate o-vinylhydroxy aromatic compound with an appropriate o-hydroxyaldehyde aromatic compound as is more fully set forth in "Methanodioxocins and a Process for Making Them," Ser. No. 609,694, filed Sept. 22, 1967, the disclosure of which is hereby incorporated by reference. A specific bromodioxocin, 2-bromo-MDBD is made by the reaction of o-coumaric acid, 5-bromosalicylaldehyde, water and hydrobromic acid. After heating the above mixture at reflux temperature for 16 hours, sodium hydroxide is added and the resulting mixture is heated at reflux temperature for an additional hour. After filtration, the yellow solid remaining is 2-bromo-MDBD. Other bromodioxocins are made by selection of appropriate aromatic reactants as is shown in the above cited application.

The cyanodioxocins are useful starting materials for their corresponding carboxydioxocins which in turn are starting materials for plasticizers and resins. For example, the cyanodioxocins are readily converted to their corresponding carboxydioxocins by well known hydrolysis conditions in the presence of an acid or a base. Specifically, 70% sulfuric acid or aqueous sodium hydroxide easily converts a cyanodioxocin to its corresponding carboxydioxocin.

The carboxydioxocins are useful as starting materials for plasticizers and resins. For example, both the mono and polycarboxylic derivatives of MDBD are made into plasticizers by reaction with alcohols, e.g. octyl alcohol, to make esters which have low vapor pressure and are difficult to leach out. The low vapor pressure gives the plastic material a long useful life before it becomes brittle and cracks. The polycarboxylic acids are made into useful resins by heating with polyamines, e.g. a diamine such as hexamethylenediamine at about 250° C., to make a useful polyamide suitable for fibers and castings. Similarly, they can be made into polyester resins by esterification with an alcohol, e.g. methanol, followed by a transesterification reaction with ethylene glycol. In addition, they are useful bacteriocides.

DESCRIPTION OF SPECIFIC EMBODIMENT

Example 1

2,8-dicyano-MDBD.—2,8-dibromo-MDBD (1 g.) was mixed with 1 g. of cuprous cyanide and 5 ml. of pyridine. The mixture was heated at 150° under reflux for 6 hours. Pyridine was heated by vacuum evaporation and the brown residue heated with 10% hydrochloric acid for 0.5 hour. The acid insoluble solid was dissolved in acetone and was treated with activated carbon to give a white solid, M.P. 285–290°. Three recrystallizations of the solid from acetone gave 2,8-dicyano-MDBD (30%), M.P. 310–313°.

Analysis.—Calcd. for $C_{17}H_{10}N_2O_2$ (percent): C, 74.45; H, 3.65; N, 10.22. Found (percent): C, 74.50; H, 3.63; N, 10.40.

Example 2

2-cyano-MDBD.—The same procedure and amount of reactants as the preparation of 2,8-dicyano-MDBD was adopted except that 2-bromo-MDBD was used in place of 2,8-dibromo-MDBD. The melting point of the white needle product was 153–155° C.

Analysis.—Calcd. for $C_{16}H_{11}NO_2$ (percent): C, 77.10; H, 4.41; N, 5.62. Found (percent): C, 76.9; H, 4.31; N, 5.99.

Example 3

2,8-dicarboxy-MDBD.—To a solution of 9 g. of 2,8-dibromo-MDBD in 100 ml. of benzene was added 21 g. of a 15% solution of n-BuLi in ether. The reaction was conducted under a nitrogen atmosphere. Heating was started as soon as n-BuLi solution was added to the solution and after a short time, white solid started to precipitate out. In the course of an hour at 50–60° C., the solution was full of white precipitate. Then the reaction mixture was poured into crushed solid $CO_2$ with stirring. Ether (100 ml.) was used to wash out the slurry remaining in the flask. After 0.5 hour, water was added and two layers formed. Acidification of the water layer with hydrochloric acid gave a white solid. The ether layer was extracted with 10% sodium bicarbonate solution. Acidification of the bicarbonate solution gave small amounts of white solid. The combined white solids were recrystallized from the tetrahydrofuran to give 4.6 g. (63%) of white solids, M.P. >300°.

Analysis.—Calcd. for $C_{17}H_{12}O_6$ (percent): C, 65.38; H, 3.85. Found (percent): C, 65.60; H, 4.03.

This chemical was dissolved in isopropanol and diluted to 500 parts per million in warm melted agar. After solidification of the agar solution, a droplet containing *Bacillus subtilis* was placed on its surface and incubated. 50% control of *Bacillus subtilis* was observed.

This acid can be heated with excess n-octyl alcohol and toluene at reflux temperature in the presence of catalytic amounts of p-toluenesulfuric acid. Water formed by the esterification reaction is removed by azeotropic distillation with toluene. The organic solution can then be extracted with 5% sodium bicarbonate solution to remove any unreacted acid and the catalyst. The clear viscous residue is then mixed with polyvinyl chloride to give flexibility to the plastic.

Example 4

2-carboxy-MDBD.—The same procedure and amount of reactants as the preparation of MDBD-2,8-dicarboxylic acid was used except that 2-bromo-MDBD was used in place of 2,8-dibromo-MDBD. The melting point of the white solid product was 179–182° C.

Analysis.—Calcd. for $C_{16}H_{12}O_4$ (percent): C, 71.34; H, 4.48. Found (percent): C, 70.8; H, 4.49.

Some other new cyanodioxocins which are produced from their corresponding bromodioxocins by similar methods are:

4-cyano-MDBD or 4-carboxy-MDBD from 4-bromo-MDBD;

1-cyano-MDBD or 1-carboxy-MDBD from 1-bromo-MDBD;

3-cyano-MDBD or 3-carboxy-MDBD from 3-bromo-MDBD;

2,4-dicyano-MDBD or 2,4-dicarboxy-MDBD from 2,4-dibromo-MDBD.

1,3-dicyano-MDBD or 1,3 - dicarboxy-MDBD from 1,3-dibromo-MDBD;

7,9 - dicyano-MDBD or 7,9-dicarboxy-MDBD from 7,9-dibromo-MDBD;

2,4,8,10-tetracyano - MDBD or 2,4,8,10-tetracarboxy-MDBD from 2,4,8,10-tetrabromo-MDBD;

3-cyano-13-methyl-MDBD or 3 - carboxy-13-methyl-MDBD from 3-bromo-13-methyl-MDBD;

6-ethyl-8-cyano-13-methyl-MDBD or 6 - ethyl-8-carboxy-13-methyl-MDBD from 6-ethyl-8-bromo-13-methyl-MDBD;

2-methyl-10-cyano-MDBD or 2 - methyl-10-carboxy-MDBD from 2-methyl-10-bromo-MDBD;

6-cyano-8,15-dimethyl-MBDBD or 6-carboxy-8,15-dimethyl MBDBD from 6-bromo-8,15-dimethyl-MBDBD;

2-chloro-10-cyano - MDBD or 2 - chloro-10-carboxy-MDBD from 2-chloro-10-bromo-MDBD;

6,11 - dimethyl - 9 - cyano-7H,13H-7,13-methano-(1,5)-benzodioxocino(3,4-c)-quinoline or 6,11 - dimethyl-9- carboxy - 7H,13H-7,13 - methano(1,5)-benzodioxocino(3,4-c)-quinoline from 6,11 - dimethyl-9-bromo-7H, 13H - 7,13 - methano(1,5) - benzodioxocino(3,4 - c)-quinoline;

6-ethyl - 8 - cyano - 13 - methyl-6H,12H-6,12-methano (1,5)-benzodioxocino(3,4 - b) - pyridine or 6 - ethyl-8-carboxy - 13 - methyl-6H,12H-6,12-methano(1,5)-benzodioxocino(3,4-b) - pyridine from 6 - ethyl-8-bromo - 13-methyl-6H,12H - 6,12 - methano(1,5) - benzodioxocino (3,4-b)pyridine;

2-methoxy - 4 cyano - MDBD or 2-methoxy - 4 - carboxy-MDBD from 2-methoxy - 4 - bromo - MDBD; and 1-chloro - 2 - cyano-MDBD or 1 - chloro-2-carboxy-MDBD from 1-chloro-2-bromo-MDBD.

Similarly, the cyanodioxocins and carboxydioxocins given in Table I below are made from their corresponding bromodioxocins.

further provided that in no case can a cyano and carboxyl group be present in the same molecule; and $R_3$ combined with $R_4$ as well as $R_5$ combined with $R_6$, together with

TABLE I

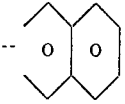

| $R_1$ | $R_2$ | $R_3$ | $R_4$ | $R_5$ | $R_6$ | $R_3+R_4$ | $R_5+R_6$ | A | B | E | F | G | J | K | L |
|---|---|---|---|---|---|---|---|---|---|---|---|---|---|---|---|
| $C_3H_7$ | $C_{16}H_{33}$ | | (¹) | | | 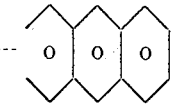 | | CH | CH | C | C | CH | C | CH | CH |
| $C_6H_{13}$ | (²) | Phenoxy | (¹) | | |  | | C | C | CH | C | CH | CH | CH | C |
| $C_{16}H_{33}$ | $C_3H_7$ | $OC_{16}H_{33}$ | (¹) | | (²) | | | CH | CH | C | CH | CH | C | C | CH |
| Phenyl | $CH_3$ | $C_4H_9$ | | (¹) | |  | | CH | C | CH | C | CH | N | C | C |
| $CH_3$ | $C_4H_9$ | | | (¹) | |  | | C | CH | C | N | CH | CH | C | CH |
| $C_4H_9$ | Phenyl | | (¹) | $CH_3$ | | 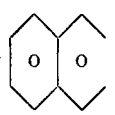 | | CH | CH | C | C | CH | C | N |
| $C_{15}H_{31}$ | $C_4H_9$ | | | Naphthoxy | (¹) |  | | C | C | C | CH | N | CH | CH | C |
| $C_3H_7$ $C_{18}H_{37}$ | $C_{18}H_{37}$ $C_4H_9$ | $C_{18}H_{37}$ (¹) | (¹) $C_4H_9$ | | | | | CH CH | CH C | C N | C CH | CH CH | CH CH | N C | CH C |
| $C_4H_9$ | $C_6H_{13}$ | | (¹) | | | 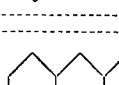 | | CH | N | C | C | C | C | CH | C |
| Naphthyl | $C_{16}H_{33}$ | $CH_3$ | (¹) | | $OC_{16}H_{33}$ | | | N | CH | C | C | CH | CH | CH |

¹ Cyano or carboxyl.
² Naphthyl.

We claim:
1. A compound having the formula

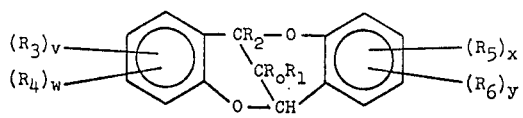

where each of $v$, $w$, $x$ and $y$ independently is an integer of from 0 to 4 inclusive; $R_0$ is H; $R_1$ is H, alkyl having up to eighteen carbon atoms or aryl hydrocarbon having up to ten carbon atoms; $R_0$ and $R_1$ may together with the C to which they are attached form the cyclohexane ring; $R_2$ is H, alkyl having up to eighteen carbon atoms or aryl hydrocarbon having up to ten carbon atoms; each of $R_3$, $R_4$, $R_5$ and $R_6$, being absent when their corresponding subscript $v$, $w$, $x$ or $y$ is 0, when present is independently alkyl having up to eighteen carbon atoms, aryl hydrocarbon having up to ten carbon atoms, chlorine, cyano, carboxyl or OM where M is an alkyl radical having up to eighteen carbon atoms or phenyl, provided that at least one of $R_3$, $R_4$, $R_5$ and $R_6$ is always cyano or carboxyl and the atoms to which they are attached may form the benzene, naphthalene, anthracene or phenanthrene ring.

2. A compound as defined in claim 1 wherein $R_3$, $R_4$, $R_5$ and $R_6$ are in the 2, 4, 8 and 10 positions.

3. A compound as defined in claim 1 wherein $R_3$ and $R_5$ are in the 2 and 8 positions and $R_4$ and $R_6$ are H.

4. A compound as defined in claim 1 wherein $R_1$ is H or alkyl having up to eighteen carbon atoms.

5. A compound as defined in claim 1 wherein $R_0$ and $R_1$ are H.

6. A compound as defined in claim 1 wherein $R_2$ is H or alkyl having up to eighteen carbon atoms.

7. A compound as defined in claim 1 wherein any ring formed by the combination of $R_3$ and $R_4$ is the benzene, naphthalene, anthracene or phenanthrene ring.

8. A compound as defined in claim 1 wherein any ring formed by the combination of $R_5$ and $R_6$ is the benzene, naphthalene, anthracene or phenanthrene ring.

9. 2-cyano-MDBD having the formula

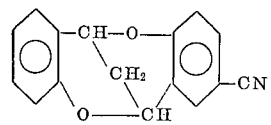

10. 2,8-dicyano-MDBD having the formula
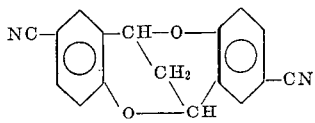
11. 2-carboxy-MDBD having the formula
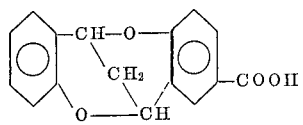
12. 2,8-dicarboxy-MDBD having the formula
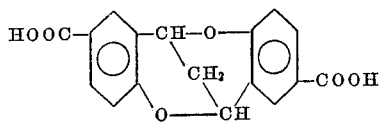
References Cited
Bhatia et al., Tetrahedron Letters, pp. 1717–20 (1966).
Westoo, Acta Chem. Scand., vol. 13, pp. 679–82 (1959).
HENRY R. JILES, Primary Examiner
J. M. FORD, Assistant Examiner
U.S. Cl. X.R.
260—75, 76, 77, 78, 251, 256.4, 287, 288, 289, 294.9, 295, 999